Sept. 15, 1970  C. W. JOHNSON  3,528,182
VISUAL SCHEDULING BOARD
Filed April 3, 1968  4 Sheets-Sheet 3
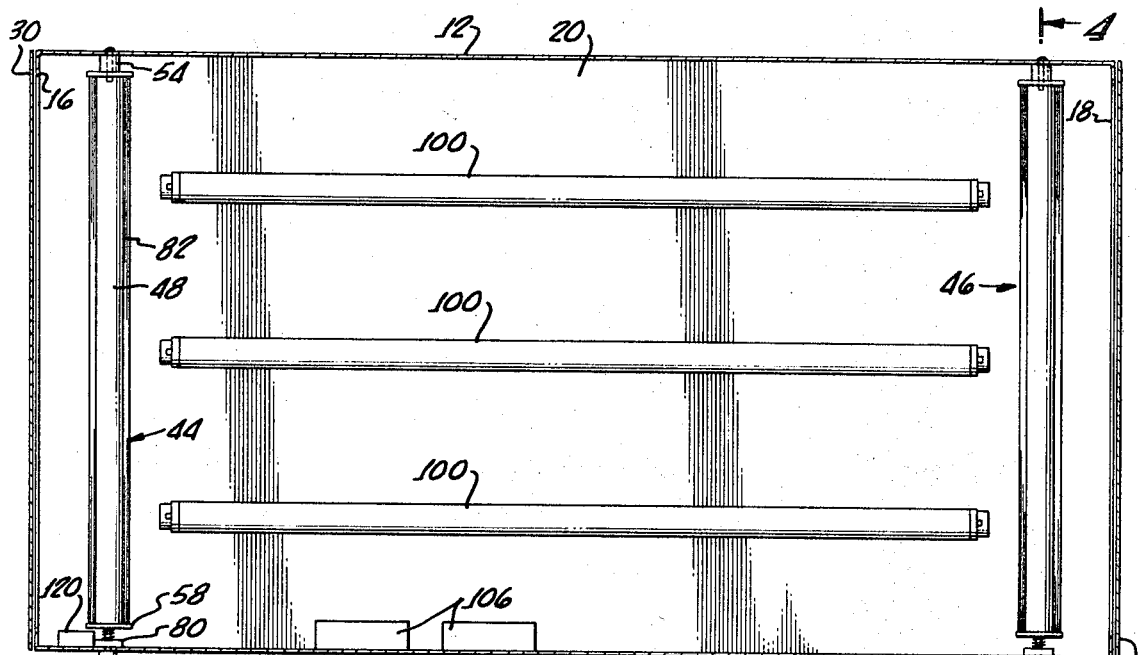
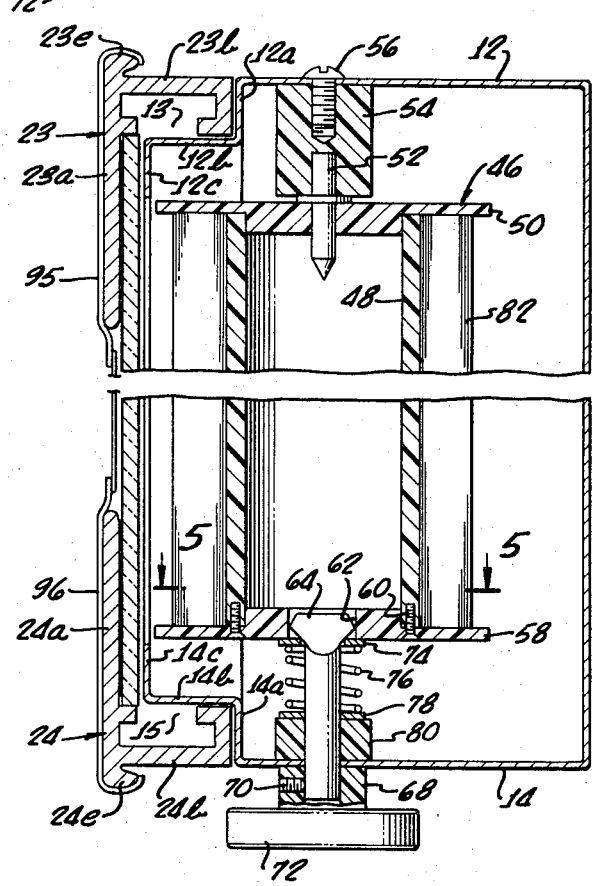
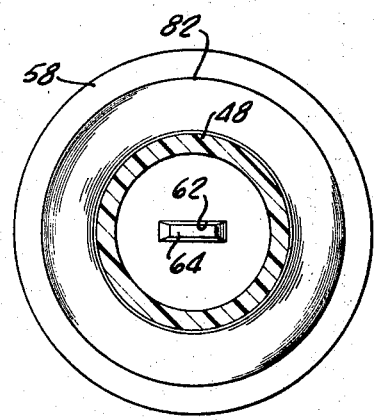
INVENTOR.
CLAUDE W. JOHNSON
BY FOWLER, KNOBBE
& MARTENS
ATTORNEYS.

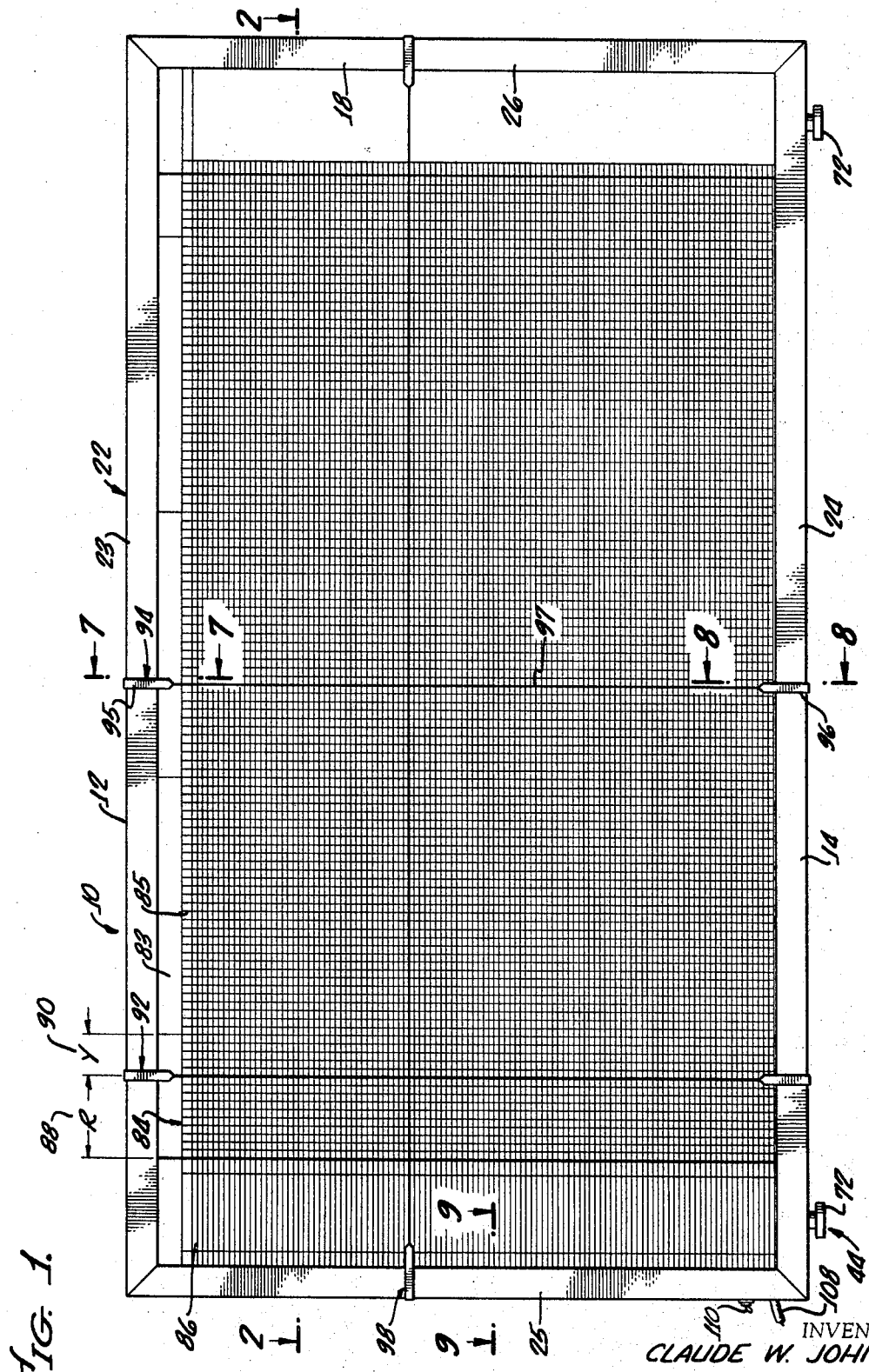

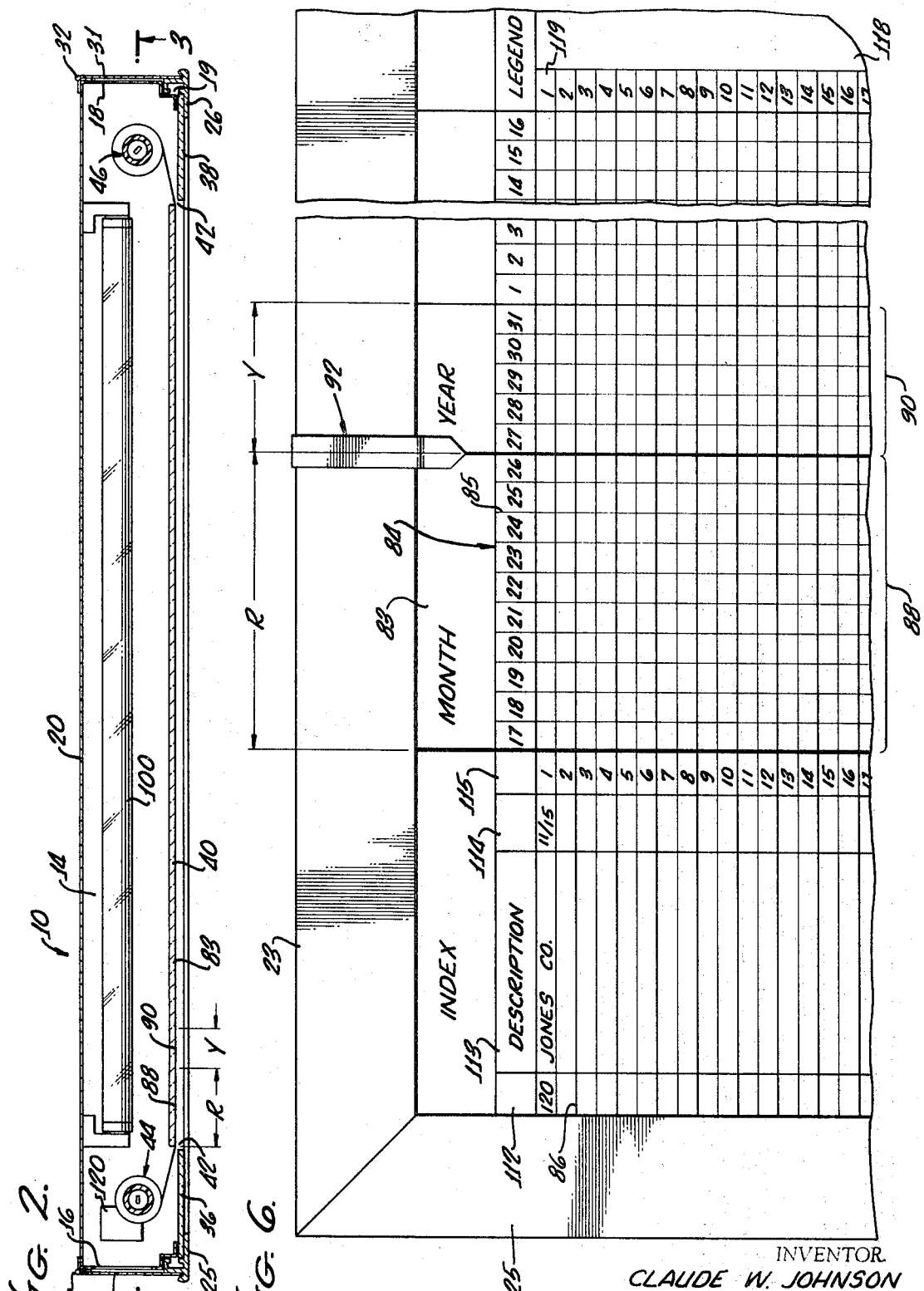

Sept. 15, 1970     C. W. JOHNSON     3,528,182
VISUAL SCHEDULING BOARD

Filed April 3, 1968     4 Sheets-Sheet 4

INVENTOR.
CLAUDE W. JOHNSON

BY FOWLER, KNOBBE & MARTENS
ATTORNEYS.

United States Patent Office 3,528,182
Patented Sept. 15, 1970

3,528,182
VISUAL SCHEDULING BOARD
Claude William Johnson, Berkeley, Calif., assignor to
Quill Products, Inc.
Filed Apr. 3, 1968, Ser. No. 718,456
Int. Cl. G09b 19/18
U.S. Cl. 35—24                                           10 Claims

ABSTRACT OF THE DISCLOSURE

A roll of translucent grid paper is advanced across a lighted translucent panel having two vertical, colored zones along one edge. The vertical grid lines represent time intervals, and scheduling data is entered on the horizontal lines to correspond with other scheduling information on an index at the colored edge of the panel. By advancing the paper so that the current vertical time line is aligned with the intersection between the two colored sections, the status of various tasks to be performed may be easily seen on the illuminated board.

BACKGROUND OF THE INVENTION

This invention relates to a scheduling board having an improved arrangement for quickly and clearly providing current visual information regarding the status of various tasks to be performed or events to occur within predetermined scheduled times.

In the course of many activities, it is desirable that various operations to be performed or events to occur be visually displayed on a control board so that the status of the activities can be quickly determined. It is desirable that a visual control board should show at a glance what has to be done and when, as well as the work completed. It is also often desirable that the control board provide a permanent record of each item scheduled so that the information is readily available while still in the control board and also may be stored for future use after being taken from the control board.

In addition to having all of the basic information necessary on the control board, there is a need that the system employed provide a suitable warning for work items approaching their completion date and a further signal for items which are overdue, thus spotlighting the need for immediate action. This information should be clearly visible at a considerable distance from the board without undue hunting or searching. Some known scheduling boards include the basic information, but it is difficult to quickly determine the status of an item since there is a considerable quantity of information on a large board and there is no adequate means to pinpoint the specific current information needed.

An adequate scheduling board should also be simple to operate and understand. In order to be commercially successful, it is necessary that the control board be easy to manufacture and assemble so that it is economical to produce and hence competitive with other scheduling devices.

SUMMARY OF THE INVENTION

In accordance with this invention there is provided a board including a relatively large surface for recording scheduling data thereon, with the surface being made of material through which light can pass. Located behind the surface is an arrangement for providing a zone visibly superimposed on the surface which visually contrasts with the surface. Means are also provided for progressively changing the transverse relative position of the surface and zone so that the position of the data on the surface changes with respect to the visible zone to thereby provide status information regarding the data.

In a preferred construction, the surface upon which the data is recorded is formed of a roll of translucent grid paper extending between two vertically oriented rollers. A translucent panel supports the paper between the two rollers, and the contrasting zone is formed by colored paint on one edge of the panel. A light source behind the panel brightly illuminates the paper and the colored zone. By forming the colored zone into two sections such as a yellow section and a red section, and by progressively advancing the paper roll so that the vertical line representing the current time is aligned with the intersection between the yellow and red colored zones, the yellow zone serves as a warning that those items included within its boundaries must be completed within a certain period of time while the red zone indicates an alarm condition that any item uncompleted within that zone is behind schedule or delinquent.

BRIEF DESCRIPTION OF THE DRAWINGS

FIG. 1 is a front elevational view of the scheduling board of the invention;

FIG. 2 is a cross-sectional view of the scheduling board taken along line 2—2 of FIG. 1 illustrating the rollers, the light source, and the interior of the board;

FIG. 3 is a cross-sectional view on line 3—3 of FIG. 2 further illustrating the rollers, the light source and the interior of the board;

FIG. 4 is an enlarged cross-sectional view of a roller and its mounting structure; on line 4—4 of FIG. 3;

FIG. 5 is a cross-sectional view on line 5—5 of FIG. 4 further illustrating the construction of the roller;

FIG. 6 is an enlarged fragmentary view of the upper left corner of the scheduling board of FIG. 1 illustrating the operation of the board;

DESCRIPTION OF THE PREFERRED EMBODIMENT

Figure 7:
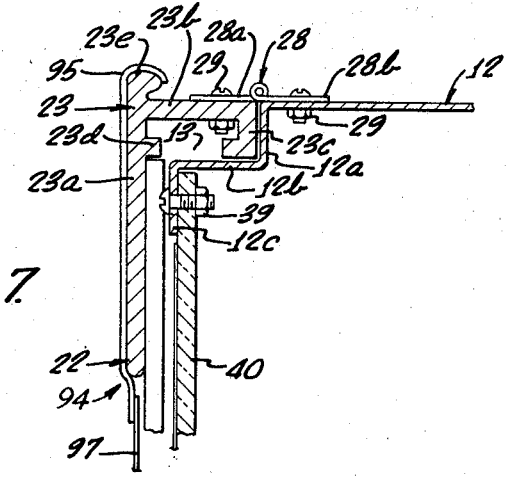
FIG. 7 is an enlarged side cross-sectional view on line 7—7 of FIG. 1 illustrating the connection of the front frame and the center panel to the main housing.

Referring first to FIGS. 1–4, the scheduling board of the invention may be seen to include a large rectangular housing generally indicated by the numeral 10 which includes a top wall 12, a bottom wall 14, side walls 16 and 18, a back wall 20, and a front frame 22. As can be seen, the back wall 20 is a large rectangular panel while the walls 12, 14, 16, and 18 are relatively narrow and elongated forming the rectangular outline of the housing. As seen in FIGS. 4 and 7, the front portion of the top wall 12 is formed with a depending vertical flange 12a and a horizontal flange 12b, which together define a right angle, outwardly opening recess 13 extending across the top front of the board. To provide further strength to the structure, a front vertical flange 12c depends from the forward edge of the horizontal flange 12b.

Figure 8:
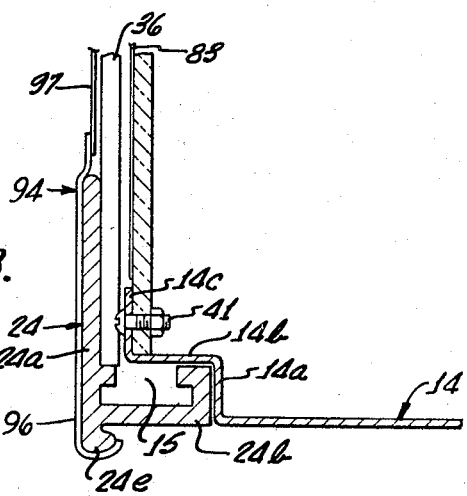
FIG. 8 is an enlarged cross-sectional view on line 8—8 of FIG. 1 illustrating the connection of the center panel to the housing.

Similarly, as seen in FIGS. 4 and 8, the forward portion of the bottom wall 14 is formed with flanges 14a and 14b defining a recess 15 along the front bottom of the board. A front vertical flange 14c extends upwardly from the horizontal flange 14b.

Figure 9:
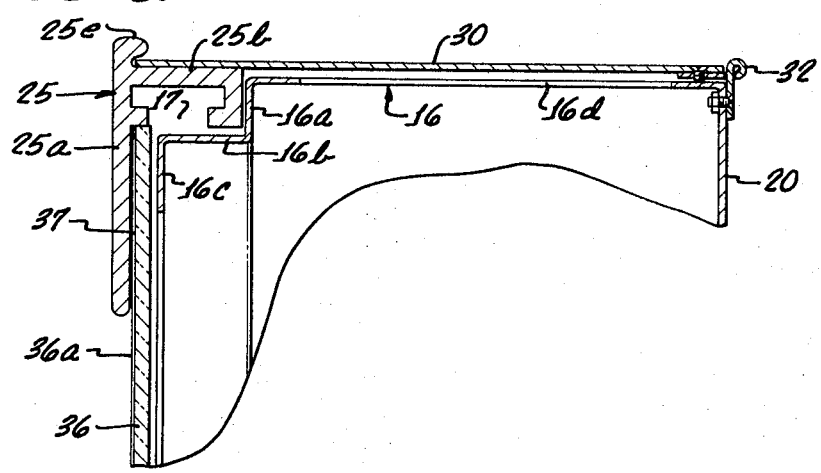
FIG. 9 is an enlarged fragmentary view of the left end of the board taken on line 9—9 of FIG. 1 more clearly illustrating the structure in that area.

Referring to FIGS. 2 and 9, the forward portion of the side wall 16 is formed with an inwardly extending flange 16a and a forwardly extending flange 16b, which together define a right angle, outwardly opening, vertical recess 17 at one front corner of the board. A flange 16c extends inwardly from the leading edge of the flange 16b to further strengthen the structure. In like fashion the forward portion of the side wall 18 is formed with flanges defining a corner recess 19.

The front frame 22 includes a top element 23, a bottom element 24, and side elements 25 and 26. Each of the frame elements is preferably formed of lightweight material, such as aluminum, which may be conveniently extruded to provide the angular cross section shown in FIGS. 4 and 7–9. The top frame element 23 includes a front flange 23a, a top flange 23b, and stiffening sections 23c and 23d which provide further rigidity to the frame. As seen, the section 23c and an adjacent portion of the flange 23b fit within the top edge recess 13. The front flange 23a is further formed with an edge head 23e which extends outwardly beyond the side flange 23b.

As seen in FIGS. 4, 8 and 9, the other frame elements 24, 25 and 26 are formed and numbered similar to the element 23, and similarly fit within their respective front edge recesses 15, 17 and 19.

Referring to FIG. 7, the frame 22 is attached at its top element 23 by a plurality of suitable hinges 28 to the top wall 12. More specifically, one leg 28a of each hinge it attached by a suitable fastener 29 to the top flange 23b of the frame while the other leg 28b is attached by another fastener 29 to the forward edge of the top wall 12. This arrangement permits the entire frame 22 to be swung upwardly for access into the interior of the scheduling board housing. The bottom of the frame may be provided with a suitable latch (not shown) for cooperation with the bottom housing wall 14 to retain the frame in closed position.

Referring to FIGS. 2 and 9, the side wall 16 is formed with a large opening 16d to permit access to the interior of the housing. Covering the opening 16d and the entire side wall is a cover 30 hinged to the back housing wall 20 by a suitable hinge 32. The forward edge of the cover 30 is positioned by the head 25e on the side frame element 25. The opposite side wall 18 is similarly formed with a large opening covered by a cover 31, which is hinged to the back wall 20 and which cooperates with the side frame element 26. Thus, when the front frame 22 is swung upwardly, the side panels 30 and 31 are released and may be swung outwardly.

Still referring to FIGS. 2 and 9, a thin vertically extending front, side panel 36 is attached by a layer of glue 37 at its outer edge to the side frame element 25 and extends inwardly roughly parallel to the frame 22. Similarly, on the right side of the frame, a thin vertically extending front, side panel 38 is glued to the side frame element 26. With this arrangement, the front, side panels 36 and 38 advantageously move with the frame 22.

Covering the front surface of the side panels 36 and 38 is a thin layer 36a and 38a of durable transparent material having horizontal lines formed thereon. The material can be written on with an implement such as a grease pencil, and the markings can be easily erased without damaging the material. An example of a suitable plastic material for the layer 36a is that known by the trade name Mylar.

Positioned within the front of the housing 10 behind the frame 22 is a large rectangular panel 40. As seen from FIGS. 2, 7 and 8 the panel 40 is centrally located between the side panel members 36 and 38, spaced slightly from the side panels so that a pair of narrow vertically extending slits 42 are formed along each side of the front center panel 40. The top edge of the center panel 40 is attached by suitable fastening means 39 to the top wall flange 12c. The lower edge of the center panel 40 is fixed to the housing 10 by a plurality of suitable fasteners 41 extending through the bottom wall upwardly extending flange 14c. Positioning the center panel 40 on the back side of the flanges 12c and 14c, as shown, locates the center panel slightly to the rear of the side panels 36 and 37 as mentioned above.

The side panels 36 and 38 and the central panel 40 are formed of a material through which light can pass such as a light-weight rigid translucent plastic material. An acrylic resin material has been found to be quite satisfactory.

Within the scheduling board, there is located a pair of roller assemblies 44 and 46 which extend vertically behind the panel members 36 and 38, respectively. Or stated otherwise, the roller assemblies 44 and 46 are positioned adjacent but slightly to the rear of the slits 42 or the side edges of the center panel 40. The roller assemblies 44 and 46 are identical in construction and hence only one is illustrated in detail in FIGS. 4 and 5.

As seen in FIG. 4, the roller assembly 46 includes an elongated vertically oriented tube 48 having secured to its upper end a flange 50. A stub shaft 52 is supported by a mounting block 54 which is secured to the top wall 12 by a threaded fastener 56. The stub shaft 52 extends through an opening in the end flange 50 to support the upper end of the roller tube 48 for rotation. The lower roller end flange 58 is removably attached to the elongated tube 48 by a plurality of threaded fasteners 60. The flanges 50 and 58 as well as the cylindrical tube 48 are preferably made of a light weight rigid plastic material. The lower flange 58 is formed with a central elongated slot 62, FIG. 5, in which is positioned a plastic driver 64 carried on the upper end of a drive shaft 66 which extends through the lower wall 14 of the housing. Attached to the lower end of the drive shaft 66 by a set screw 70 is a suitable knob 72.

Surrounding the drive shaft 66 are an upper washer 74, a compression spring 76, a lower washer 78, and a bearing sleeve 80. As can be seen, the upper washer 74 is urged by the spring 76 into engagement with the lower surface of the driving element 64. The lower washer 78 is urged against the bearing sleeve 80 which rests on the bottom wall 14, with the result that the upper washer 74 is constantly urged to its upper position. The diameter of the upper washer 74 is larger than the opening in the lower roller flange 58 so that the flange 58 and hence the tube 48 rest on the upper surface of the washer 74.

Carried by the two roller assemblies 44 and 46 is a large roll of translucent material 82 such as paper or plastic which extends between the rollers by traveling through the slits 42 and across the front surface of the center front panel 40. The material 82 is preferably of good quality so that it may be written on and permanently stored. If desired, the material may be such that markings can be easily erased. As one alternative, a layer of thin plastic (not shown) may be employed, extending over a layer of paper to facilitate erasing when an erasable marking substance is used. The material 82 is formed with a rectangular grid 84 as may be seen from FIGS. 1 and 6. More specifically, the grid 84 is formed by a plurality of spaced vertically extending lines 85 intersected by a plurality of spaced horizontal lines 86. At any given time it will be appreciated that a single rectangular section 83 of the roll of material 82 extends across the panel 40.

Referring to FIGS. 1 and 2, there is located along the left edge of the front central panel 40 and the section 83 of paper a vertically extending zone 88 formed by a layer of translucent material colored red. This zone is preferably formed by applying a thin layer of translucent acrylic paint directly onto the front surface of the center panel 40. The zone 88 extends from the top of the panel to the bottom, and the width and coloring of the zone is indicated by the letter R and the arrows shown on the drawings in FIGS. 1, 2 and 6.

Adjoining the red colored zone 88 to the right toward the center of the front panel 40 is a second colored zone 90 formed by a layer of material which is preferably given a yellow color as indicated by the letter Y in FIGS. 1, 2 and 6. This zone 90 also extends from the top to the bottom of the front panel and the width of the zone 90 is indicated by the arrows shown on the drawings. As can be seen, the width of both color coded zones 88 and 90 is greater than the spacing between adjacent grid lines 85.

As shown in FIGS. 1, 7 and 8, there is provided a pair of slideable identification line assemblies 92 and 94 each of which includes an upper bracket 95 hooked onto the bead 23e of the top frame element 23 and a lower bracket 96 hooked onto the lower frame element 24, with an elastic string 96 extending between the upper and lower brackets 95 and 96. These assemblies 92 and 94 are horizontally slideable along the frame so that they can be moved to a desired position, to facilitate identifying data on the board.

A similar assembly 98 extends across the width of the board between the side frame elements 25 and 26 and is vertically slideable to facilitate identification of material on a given horizontal line on the grid 84.

Referring to FIG. 3, there is provided within the scheduling board housing 10 a suitable light source such as three fluorescent bulbs 100, which are mounted on brackets 104 attached to the rear wall 20 of the housing 10. Suitable ballasts 106 for the fluorescent bulbs are shown supported on the wall 14 of the housing. The bulbs and the ballasts are, of course, suitably connected to an electrical cord 108 as illustrated in FIG. 1 extending outwardly from the case. Also seen in FIG. 1 is a switch 110 to operate the fluorescent bulbs.

In utilizing the scheduling board of the invention, assume first that it is necessary to install an unused roll of grid paper 82. This is accomplished by pivoting the front frame 22 upwardly carrying with it the side panels 36 and 38 while the center front panel 40 remains fixed to the housing top and bottom walls. This permits the side walls 16 and 18 to be swung open and exposes the roller supporting shafts 52 and 66. A roll of paper 82 mounted on its roller 48 is installed in the housing by being positioned in the right roller assembly 46 as viewed in FIG. 2. The roll is installed by simply pulling downwardly on the control knob 72 against the bias of the spring 76 so that the drive shaft 66 is lowered. This enables the roller flange 50 to be positioned onto the stub shaft 52, and it is then possible to insert the driving element 64 of the drive shaft 66 into the slotted aperture 62 in the lower roller flange 58. The paper is then extended across the front surface of the panel 40 and attached to the other roller assembly 44 which is similarly inserted in the left side of the housing. The front frame 22 may then be swung closed so that side panels are positioned as shown in FIG. 2.

Refer now to FIGS. 1 and 6 for a discussion of the manner in which the control board may be utilized to control an exemplary scheduling activity. At the top of the side panel 36 on the plastic layer 36a there is marked the word "INDEX." The horizontal lines of the INDEX are divided into four columns 112, 113, 114 and 115. At the top of the widest column 113 is marked the word "DESCRIPTION," under which a description of the tasks to be performed or events to occur will be listed. In the right edge column 115, the jobs or tasks are numbered consecutively. A job number or other identifying information may be placed in the left edge column 112 if desired, and the date of the job entry onto the description column 113 may be entered in the column 114 to the right of the description column.

The vertical lines 85 on the grid 84 on the paper 83 are used to repersent intervals of time such as minutes, hours, days, weeks, months, etc. Most typically, the lines would represent days as indicated by the numbered spaces on the top line of the grid. The month and year are indicated in the space above the day spaces. On the date on which a certain act is to be performed with respect to an item listed under the INDEX DESCRIPTION column 113, a suitable code or marking should be entered on the grid 84 in the column below the day that the act should occur. Various codes or symbols may be employed for this purpose and a legend explaining the meaning of the symbols used can be conveniently positioned on the plastic layer 38a on the right front side panel 38. As shown in FIG. 6, the word "LEGEND" is entered at the top of the panel 38; and beneath this in a column 118, the explanatory information is entered. In the column 119 to the left of the column 118, the spaces are numbered to conveniently correspond with the numbered spaces of the INDEX column 115.

The board can of course be made in various sizes so that the desired space is available to list all of the necessary items. Thus, when all items have been listed and the time the events to be performed have been properly entered on the grid 84, the time control aspect of the chart comes into play. The identification line assembly 92 is to represent the current date and may be referred to as the "today" line. The "today" line 92 is to be moved to the line marking the intersection of the red and yellow zones 88 and 90 as shown in FIG. 6. Each day, the chart is advanced by rotating the control knob 72 of the left roller assembly 44 so that the current date is beneath the today line 92. When an item is completed, a suitable mark indicating such should be placed on its space on the grid 84.

The yellow zone 90 indicates or provides a warning that the items to be accomplished are approaching the date on which they should be performed. The red zone 88 indicates that the date has passed and the item should have been completed or else is delinquent. When the switch 110 is off so that the lamps 100 are not energized, the front of the board simply appears white with its markings usually in black shown on the material 82. The colored zones do not appear and the illumination in general is not very vivid. However, by closing the switch 110 to energize the bulbs, all of the markings on the board become very vivid and the red and yellow zones may be clearly seen superimposed on the paper. Accordingly, it is possible to see at a glance by looking at the yellow zone 90 which items must be performed within the next few days. Similarly, it is very easy to glance at the red zone and see which items have been completed and which are delinquent.

If it is desired to see what was done some time previously, it is only necessary to operate the knob 72 of the right hand roller assembly 46 to reverse the direction of the roll of material 82. The roll can, of course, be made in any desired length so that a large amount of scheduling data can be placed on a single roll. Another convenient aspect of the arrangement is that the roll becomes a permanent record of the scheduling activity in that after a given roll is completed, it is a simple matter to remove the roll, store it, and simply add a new roll in the manner previously described. Also, it is easy to erase items under the INDEX column or under the LEGEND column to fit a different scheduling operation.

In a variation of the invention, the markings on the grid 84 may be made with a substance that is invisible to fluorescent, incandescent or sunlight but becomes visible when subjected to ultraviolet light in surroundings having subdued lighting. Thus by replacing the fluorescent bulbs 100, with ultraviolet lamps, or so-called "black lights," the board will appear blank until the ultraviolet lamps are energized. This arrangement may be convenient when limited access to the information is desired. For further protection the switch for energizing the ultraviolet lights may be locked so that only authorized personnel will have access to the scheduling information on the board.

As another variation of the invention, the scheduling board may be provided with a suitable timer, schematically illustrated at 120 in FIG. 2, which will automatically advance the roll of paper one time interval at a predetermined time, such as when the board is not being used, so that the activities for a given day will be automatically aligned with the "today" line.

What is claimed is:

1. A visual scheduling board comprising:
   a rigid panel;
   a roll of translucent paper having a grid formed thereon of intersecting horizontal and vertical lines, the paper being extended across said rigid panel for the permanent recording of scheduling data thereon;
   means located behind said paper for providing a translucent colored zone visibly superimposed on said paper which visually contrasts with said paper, the zone extending vertically across the paper and having a width at least as great as the spacing between a pair of adjacent grid lines; and
   means for transversely moving said paper relative to said zone so that the position of the data on said paper with respect to the visible zone provides status information regarding the data.

2. The scheduling board of claim 1 wherein said panel behind said paper is translucent; and
   including a light source behind the panel for illuminating the paper and the colored zone.

3. The scheduling board of claim 2 wherein said light source provides ultraviolet light energy and said scheduling data may be recorded on said paper with a substance that is invisible when subjected to light in the visible range but which is visible when subjected to ultraviolet light to illuminate said data.

4. The scheduling board of claim 1 including front side panels made of material through which light can pass and located adjacent opposite edges of said paper for temporarily recording data thereon which is related to the data recorded on said paper, said paper being transversely movable relative to said side panels.

5. A visual scheduling board comprising:
   means forming a relatively large surface for recording scheduling data thereon including a grid formed on said surface by a series of spaced parallel lines representing intervals of time and by a series of spaced parallel lines perpendicular to said time lines for recording said scheduling data;
   means located adjacent said surface for providing first and second zones colored different from each other and said surface so that the zones visually contrast with each other and the surface, said colored zones being located in side by side elevation; and
   means for transversely moving said surface relative to said zones in a direction perpendicular to said time lines so that the position of the data on said surface changes with respect to the visible zone to provide status information regarding the data.

6. The scheduling board of claim 5 wherein the intersection between the two colored zones defines a line which may be aligned with the current time line on said surface.

7. A visual display board comprising:
   a housing;
   a translucent center panel mounted in the front of said housing;
   a pair of removable rollers spaced from each other and supported by said housing near opposite edges of said panel;
   a roll of translucent paper extending between said rollers and across the outer surface of said panel;
   a layer of translucent material colored differently from the paper and extending across said panel adjacent one edge of the panel behind the paper extending across the panel; and
   means located behind said panel for illuminating said roll of paper and said colored layer;
   said layer being formed of two different colors in side by side relation and the intersection formed between the two colors being adapted to represent the current time; and
   said paper being formed with lines parallel to said intersection representing intervals of time and being adapted to receive data relating to tasks or events which are to be performed by a specific time, one of said colors indicates that the task or event is approaching the time by which it must be performed, and the other color indicates that the time is passed by which the task or event should have been performed.

8. The display board of claim 7 including a pair of side panels mounted in the front of said housing located adjacent to but slightly spaced from the opposite sides of said translucent panel to define a pair of slits through which said paper extends from the front of the said translucent panel to said rollers, and means on the front surface of said side panels adapted to have recorded thereon information related to the data recorded on said roll of paper.

9. A visual scheduling board comprising:
   a hollow boxlike housing having a back wall, a top wall, a bottom wall and a pair of side walls, the top, bottom and side walls defining a substantially open front;
   a center panel mounted in the front of said housing;
   a layer of material extending across the front surface of said panel adapted to have scheduling data marked thereon;
   means within said housing adjacent opposite edges of said center panel for supporting said layer of material in a manner such that the material may be progressively moved across said panel;
   means forming a pair of front side panels supported adjacent opposite edges of said center panel in front of said supporting means for recording data on the side panels related to the data on the material extending across the center panel; and
   a rectangular frame surrounding and supporting the side panels, said frame being hingedly attached to the front of said housing to permit the frame and side panels to be swung away from the housing, thereby permitting access to the interior of the housing while said center panel remains fixed to the housing.

10. The board of claim 9 wherein each of said side walls has a large opening to permit access to the interior of said housing and said housing includes a pair of side covers hinged to said back wall, to enclose said side walls, said frame having means formed thereon for positioning the front edges of said side covers.

References Cited

UNITED STATES PATENTS

| 1,889,006 | 11/1932 | Szepesi | 116—135 |
| 2,800,733 | 7/1957 | Chevillon. | |
| 3,224,128 | 12/1965 | Steward. | |
| 3,327,406 | 6/1967 | Baker | 35—9 |

WILLIAM H. GRIEB, Primary Examiner